United States Patent [19]

Timmer

[11] Patent Number: 5,433,466
[45] Date of Patent: Jul. 18, 1995

[54] CYCLE ATTACHMENT FOR MOUNTING OVERSIZE WHEELS

[76] Inventor: Dana Timmer, Wattmanngasse 10, 1130 Vienna, Austria

[21] Appl. No.: 122,208

[22] Filed: Sep. 16, 1993

[51] Int. Cl.⁶ .............................................. B62K 19/30
[52] U.S. Cl. .................................. 280/288.4; 280/7.15
[58] Field of Search ............... 280/288.4, 30, 32, 28.5, 280/7.1, 7.15, 7.12, 7.14, 8, 9, 10

[56] References Cited

U.S. PATENT DOCUMENTS

| | | | |
|---|---|---|---|
| 551,442 | 12/1895 | Korpff | 280/7.14 |
| 570,536 | 11/1896 | Brooks | 280/7.14 |
| 633,030 | 9/1899 | Nelson | 280/7.14 |
| 3,466,059 | 9/1969 | Kiernan | 280/7.15 |
| 5,222,348 | 6/1993 | Woodling | 280/7.1 |

FOREIGN PATENT DOCUMENTS 189322 11/1966 U.S.S.R. ................. 280/7.15

OTHER PUBLICATIONS

Anon. "Monster Bike" *Mountain Bike Action*, pp. 58–62 (Aug. 1993).
Anon. "Mantis ProFloater", *Mountain Bike Action*, p. 76 (Aug. 1993).
Anon. "Trek 9200", *Mountain Bike Action*, p. 106 (Aug. 1993).

*Primary Examiner*—Margaret A. Focarino
*Assistant Examiner*—Kevin Hurley
*Attorney, Agent, or Firm*—Gregory Garmong

[57] ABSTRACT

A bicycle attachment is used to mount and drive an oversize rear wheel on a conventional bicycle frame. The attachment has a housing with a forward axle that is releasably received in the rear wheel fork of the bicycle (after the conventional rear wheel is removed) and a clamp that releasably fixes the forward end of the housing to the frame of the bicycle. The attachment extends rearwardly from the frame of the bicycle, to an attachment rear axle that mounts the oversize tire. An attachment drive system transmits the power of the standard chain drive of the bicycle to the oversize tire.

18 Claims, 4 Drawing Sheets

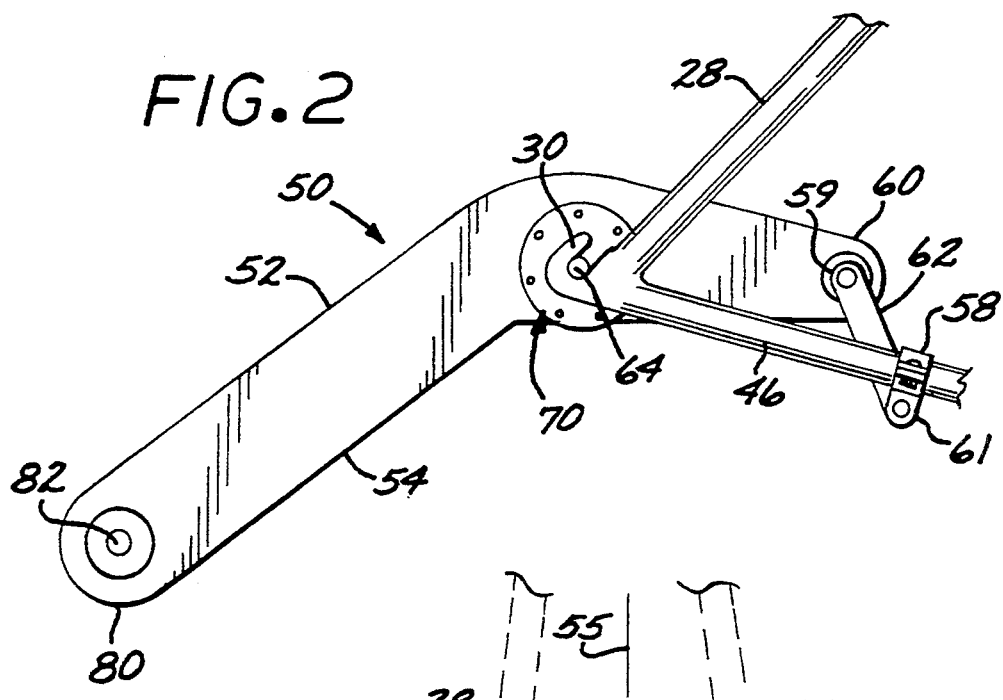
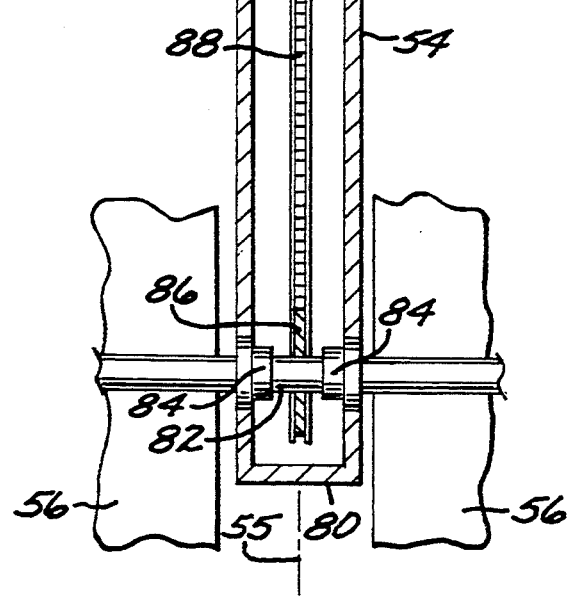

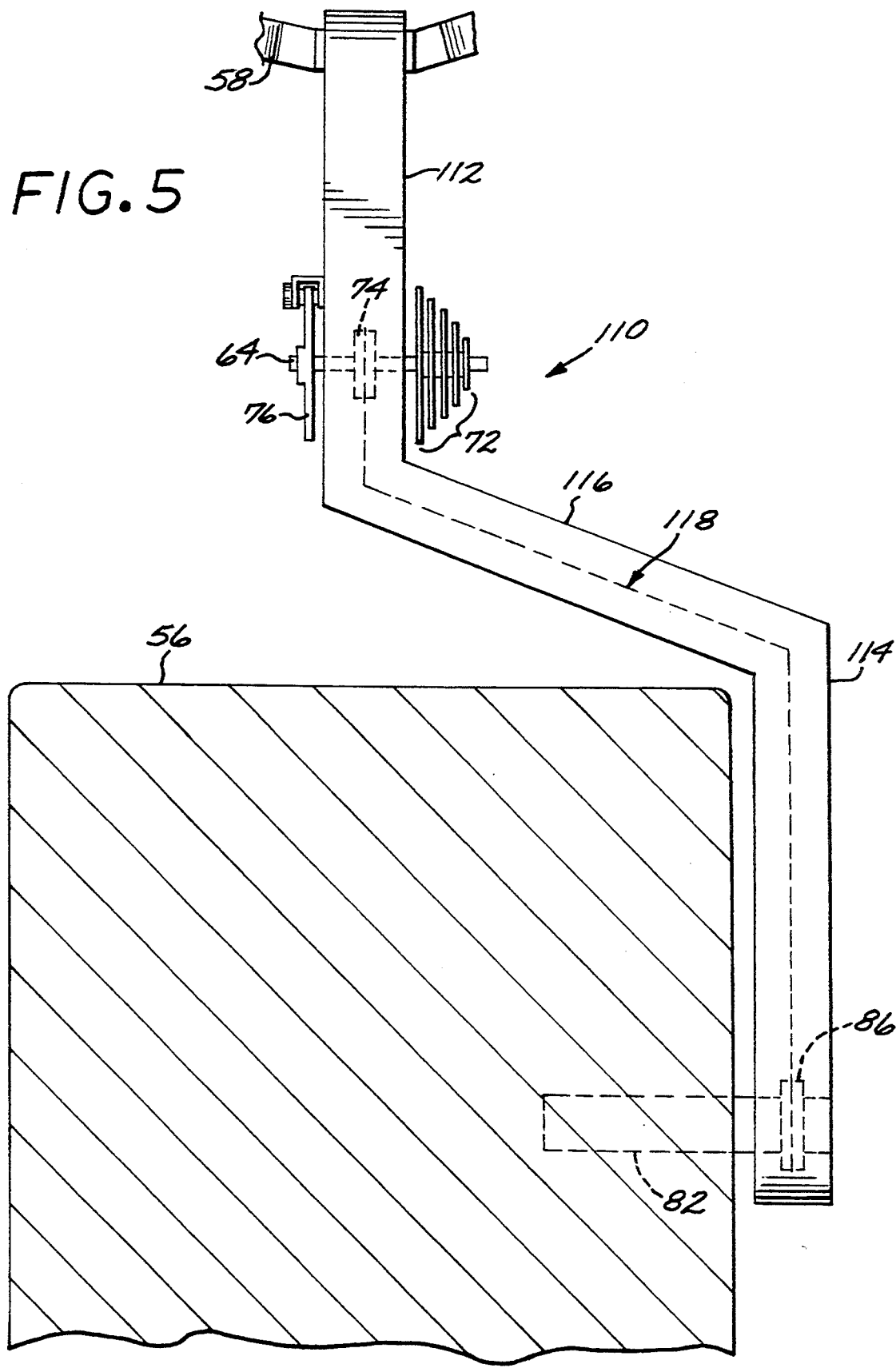

ize wheels, using existing quick release hubs found on most mountain bikes.

CYCLE ATTACHMENT FOR MOUNTING OVERSIZE WHEELS

BACKGROUND OF THE INVENTION

This invention relates to cycles such as bicycles, and, more particularly, to a removable attachment that permits oversize tires to be temporarily and removably attached to the rear of the cycle frame, thereby increasing the utility of the cycle in mud, sand, snow, or other difficult terrain.

Bicycling is widely enjoyed as both a recreation and a sport by many people. Historically, bicycling was practiced primarily on dry, hard surfaces such as level or inclined hardtop roads, which give good traction to the rear drive wheel of the bicycle. The advent of the rugged type of bicycle generally termed a "mountain bike" has opened many other areas to bicycling. Steep mountain trails are now routinely traversed on mountain bikes, particularly where the traction is good.

There has also been interest in using mountain bikes on poorer surfaces which do not offer good traction. Some riders have used mountain bikes in mud, sand, and even snow. However, in most instances the standard-size tires used for general-purpose riding do not produce sufficiently good traction and flotation on these poorer surfaces.

One approach to cycling on low-traction surfaces is to build a frame for the cycle that accepts oversize tires that achieve better traction and flotation on such surfaces. Another approach is to build a cycle that uses a caterpillar-tractor propulsion system. In these cases, the frames with oversize tires or caterpillar drives are not suitable for general-purpose street riding, and the rider must therefore have two or more cycles to permit riding on the wide range of terrains. Since mountain bikes may be rather expensive, providing a special frame for difficult terrain, which may be used only occasionally, is outside the reach of most persons. Having two different mountain bikes is also impractical, as the poor-traction terrain is often reached only after passing over conventional surfaces.

There is therefore a need for an improved approach to utilizing popular cycles such as mountain bikes on a variety of surfaces, ranging from conventional dry surfaces to low-traction surfaces such as mud, sand, and snow. The present invention fulfills this need, and further provides related advantages.

SUMMARY OF THE INVENTION

The present invention provides an attachment for use with a cycle such as a mountain bike. The attachment is removably fixed to the rear frame of the cycle in place of the conventional rear wheel. The attachment aids in utilizing the cycle in difficult terrain by permitting the mounting of one or more oversize tires on the rear of the cycle. The attachment can be used with a wide variety of basic cycle frames in order to temporarily convert them from conventional tires to oversize tires.

The attachment of the invention is structured to interconnect to and cooperate with the existing frame and drive system of a cycle. The existing structure includes a cycle frame with a cycle forward wheel fork and a cycle rear wheel fork having a pair of cycle rear wheel fork arms. A cycle rear wheel axle receiver is found on the cycle rear wheel fork arms. A cycle rear wheel has a cycle rear wheel axle detachably received in the cycle rear wheel axle receiver. A cycle rear sprocket assembly is mounted to the cycle rear wheel and a cycle forward sprocket assembly is mounted to the frame at a location to be pedaled by the rider. A cycle chain drive extends between the cycle forward sprocket assembly and the cycle rear sprocket assembly.

Within this setting, an attachment in accordance with the invention comprises a removable frame extension, which itself comprises a longitudinally elongated housing of a transverse width less than the width of the cycle rear wheel fork, such that the elongated housing removably fits between the cycle rear wheel fork arms. There is means for releasably fixing a forward end of the housing to the frame of the cycle, preferably a fixed or adjustable clamp. A transversely extending attachment forward axle is mounted to the elongated housing. The attachment forward axle is adapted to be received in the cycle rear wheel axle receiver, preferably with a quick release hub. An attachment forward sprocket assembly is rotatably mounted to the attachment forward axle and is engageable to the cycle chain drive when the attachment forward axle is received in the cycle rear wheel axle receiver. A transversely extending attachment rear axle is rotatably mounted to the elongated housing and is adapted to mount thereon at least one oversize wheel having a transverse dimension too great to fit between the cycle rear wheel fork arms. An attachment rear sprocket assembly is engaged to the attachment rear axle, and a drive means transmits power from the attachment forward sprocket assembly to the attachment rear sprocket assembly.

The removable frame extension housing can have any of several structural shapes, such as a flat form, a half yoke, or a full yoke. The housing is preferably built from a composite material such as a carbon/epoxy composite material having high specific stiffness and strength, allowing light weight, stiff, strong shapes to be made.

When the attachment of the invention is used with a mountain bike, the rider pedals the bike, changes gears, and brakes the bike in the usual way. Power is conveyed from the cycle forward sprocket assembly to the attachment forward sprocket assembly, which replaces the existing cycle rear sprocket assembly, through the existing cycle chain drive. This power is in turn conveyed to the attachment rear sprocket assembly and thence to the oversized wheel through a drive preferably including a single-chain drive using a conventional link chain, through a single-chain drive using a flexible chain, or through a multiple-chain drive using an intermediate idler axle.

Gear changing is accomplished using the existing control on the handlebar or elsewhere accessible to the rider, through the existing gear change mechanism which is not modified. To brake the cycle, the rider operates the same type of lever actuator as conventionally found on cycles. The lever controls a caliper brake unit placed at the attachment forward axle.

Thus, the attachment of the invention permits a cycle user to quickly interchange a conventional rear wheel assembly with the attachment of the invention and its oversize wheel and tire. The conventional rear wheel is generally used for dry, hard surfaces. The attachment and its oversize wheel are generally used for soft, wet, muddy, snowy, and other surfaces offering less traction to the conventional tire and requiring greater flotation by the tire. The procedure for making the interchange is quite similar to the familiar procedure of changing rear wheels equipped with quick release hubs, with the difference that the attachment housing has a clamp that must be affixed to another location on the cycle frame to react forces applied through the housing. The clamp is simple to operate, and can be made adjustable so that the attachment can be used with many different types of cycle frames.

The present invention provides an advance in the art of cycles, and permits a single frame to be used for riding on various types of conventional and unconventional terrains. The interchange between the conventional rear wheel and oversize, wide rear wheels is easy to accomplish. The rider uses the same, familiar techniques and procedures to ride the modified cycle having the attachment of the invention as to ride the unmodified, conventional cycle.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 2 is an enlarged detail of the elevational view of FIG. 1, with portions of the structure removed to illustrate the underlying structure;

FIG. 3 is an enlarged schematic sectional view of a planar form housing and related structure like that of FIG. 2;

FIG. 5 is a schematic plan view of a half-yoke housing and related structure.

DETAILED DESCRIPTION OF THE INVENTION

Figure 1:
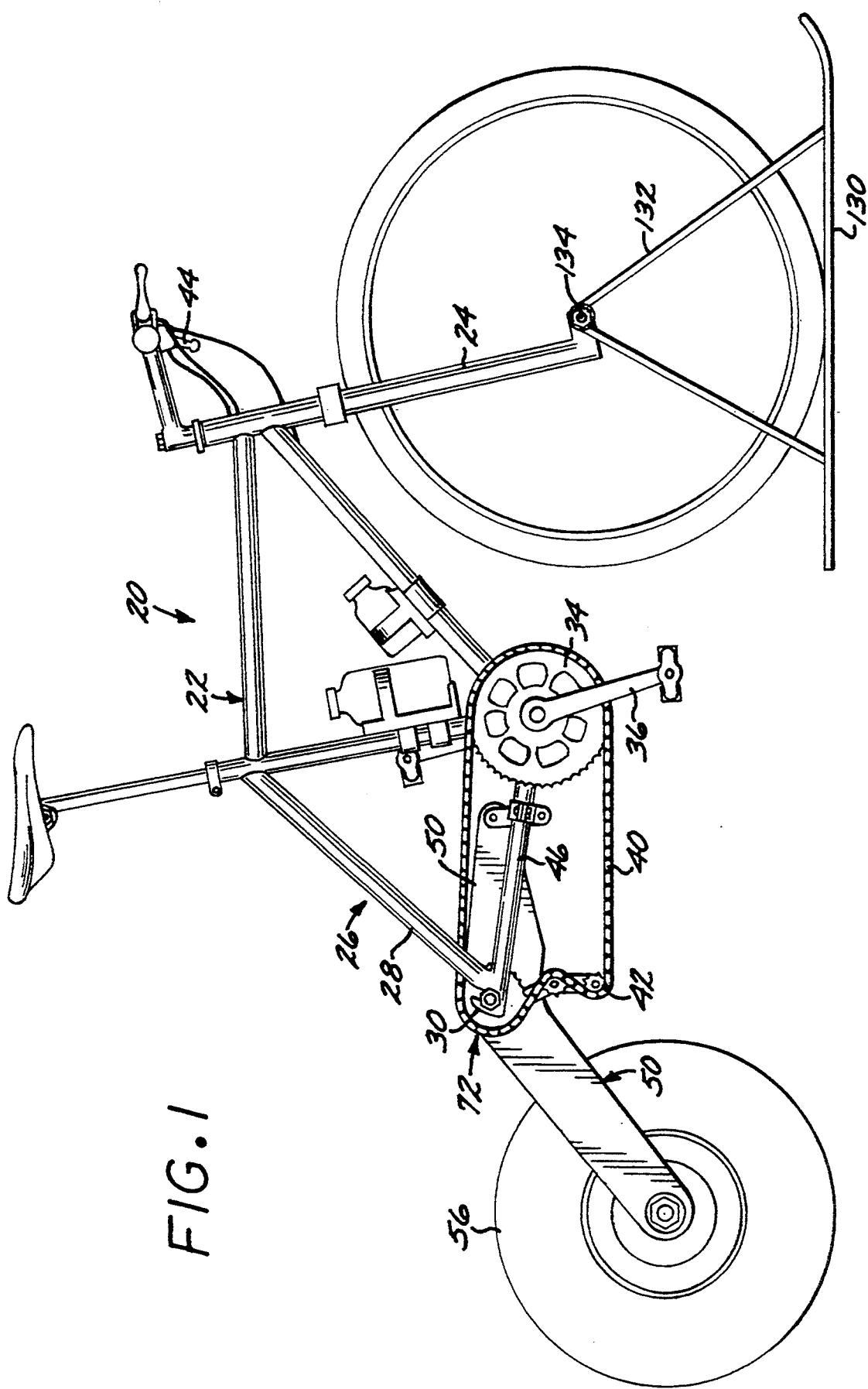
FIG. 1 is an elevational view of a bicycle utilizing the attachment of the present invention.

Referring to FIG. 1 and FIG. 2, a cycle, here depicted as a bicycle 20, has existing structure but is modified by removing some of that structure and adding the attachment of the invention. The existing structure will be described first. The bicycle 20 has a cycle frame 22 with a cycle forward wheel fork 24 and a cycle rear wheel fork 26. The cycle rear wheel fork 26 has two cycle rear wheel fork arms 28 with a cycle rear wheel receiver 30 at the end of each of the cycle rear wheel fork arms 28. The cycle rear wheel fork arms 28 are separated by a distance sufficiently great so that the rear wheel of the bicycle fits between the arms 28. The cycle rear wheel receiver 30 preferably includes a slot oriented to receive and capture therein the axle of the rear wheel (not shown, because it is removed when the bicycle is converted to the pictured form). In a common design, the axle of the rear wheel is releasably retained in the rear wheel receiver by a quick release hub (not shown). The bicycle 20 further has a cycle forward sprocket assembly 34 that is driven by a crank and pedals 96, a cycle rear sprocket assembly (not shown) supported on the rear wheel axle, and a cycle link chain 40 extending between the cycle forward sprocket assembly 34 and the conventional rear sprocket assembly. A cycle gear change mechanism 42 is operable from a cycle gear change control 44 by means of a cycle cable to change the cycle chain 40 between different individual sprockets of the cycle rear sprocket assembly. A cycle lower frame arm 46 extends between the region of the cycle front sprocket assembly 34 and the cycle rear sprocket assembly to strengthen the cycle frame 22. All of the structure described in this paragraph is conventional on most types of bicycles, and is well known in the art.

Figure 4:
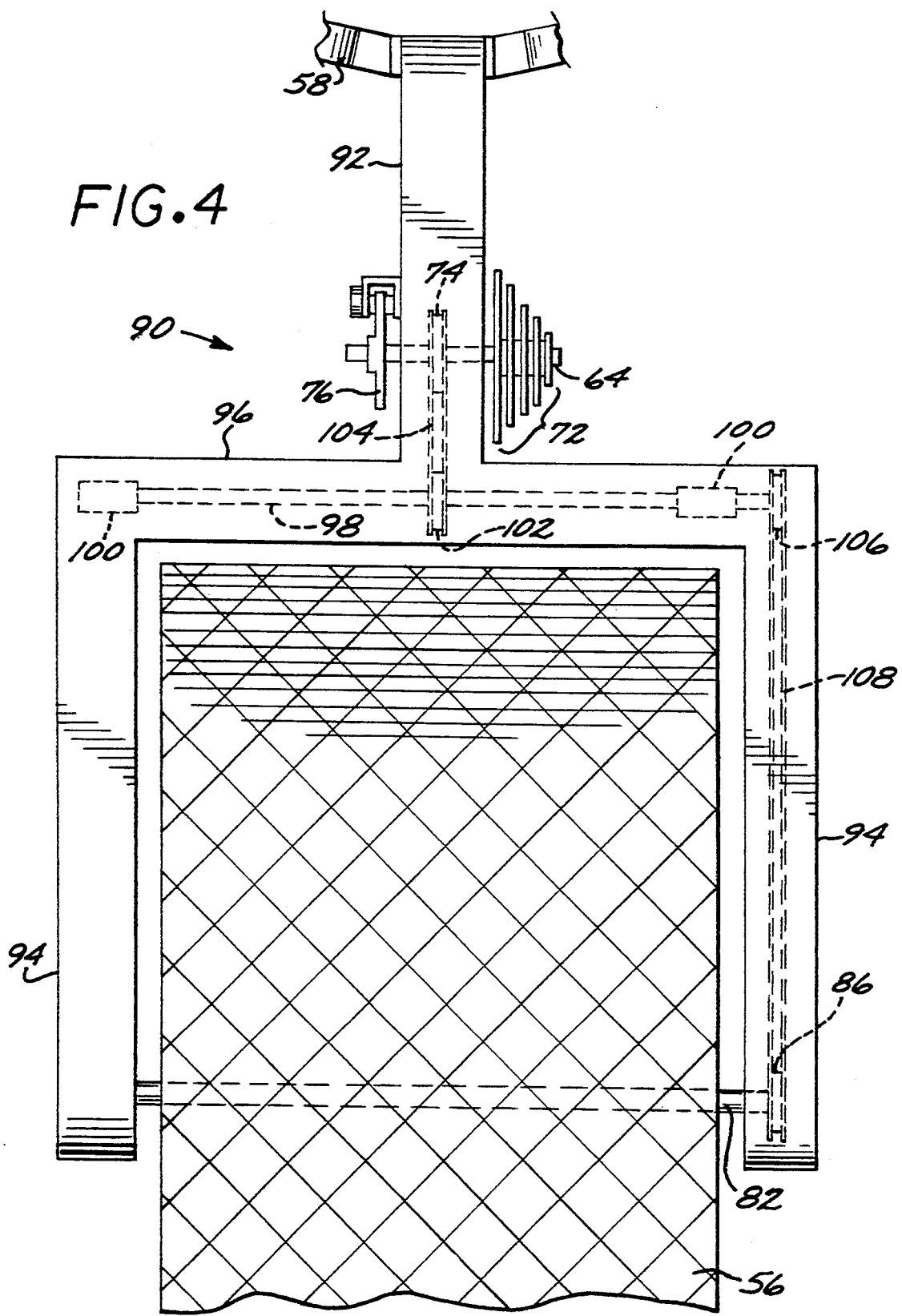
FIG. 4 is a schematic plan view of a full-yoke housing and related structure.

An attachment 50 for the bicycle 20 includes a removable frame extension 52. The frame extension 52 includes a longitudinally elongated housing 54 having a transverse width that is less than the spacing between the rear wheel fork arms 28. The elongated housing 54 removably fits between the cycle rear wheel fork arms 28, and lies on a centerline 55 of the bicycle 20 when installed to the bicycle 20. The frame extension 52 is preferably made of a material that is stiff, strong, and light weight. The most preferred material of construction is a graphite-reinforced epoxy composite material that can be provided in a great variety of required shapes. Accordingly, several different designs for the elongated housing 54 have been developed that are of particular use for various applications and bicycle configurations. FIGS. 1-3 illustrate a flat, hollow box having parallel sides and a downwardly angled elevational profile that permits the use of a rear wheel 56 of smaller diameter but greater width than the conventional rear wheel of the bicycle. FIGS. 4-5 illustrate other embodiments.

The frame extension 52 includes means for releasably fixing a forward end of the elongated housing 54 to the frame of the bicycle 20. The means for releasably fixing is preferably one or two clamps 58 attached to a forward end 60 of the elongated housing 54. Since the frame members of the bicycle 20 are generally cylindrical tubes, the clamp 58 includes a tube clamp having a bottom portion that fits below the tube, a top portion that fits above the tube, a member extending between the top and bottom portions, and a nut on the member to permit it to be manually tightened or loosened. The clamp 58 is slipped over a selected frame member, illustrated here as the lower frame arm 46, and tightened to fix the forward end of the elongated housing to the frame of the bicycle, and the process is reversed to remove tile forward end. The interconnection between the frame extension 52 and the clamp 58 may also be provided with a shock absorber such as a spring 61 that cushions shocks transmitted through the frame extension 52.

In the embodiment of the clamp shown in FIG. 2, the clamp 58 is mounted on a swivel arm 62 that is rotatably and lockably mounted to the forward end 60 of the housing 54. The clamp 58 can be swiveled to any rotational position so as to be lockable to a variety of frame types and configurations on different brands of bicycles, and then locked into position with a locking nut 59. In another embodiment shown in FIG. 3, the clamp 58 is fixed.

A transversely extending attachment forward axle 64 is positioned so as to be receivable in the cycle rear wheel receivers 30 of the cycle rear wheel fork arms 28. A sleeve bearing 66 overlies the central portion of the attachment forward axle 64. The sleeve bearing 66 is mounted to the elongated housing 54 by a pair of bearings 68, thereby supporting the forward axle 64 in the housing 54. The axle 64 itself does not turn, but the sleeve bearing 66 and elements mounted to it are free to turn relative to the axle 64 and the housing 54.

The axle 64 is receivable in the rear cycle rear wheel receivers 30. The axle 64 can be removably fixed to the cycle rear wheel fork arms 28 with a quick release hub 70. The locking of the quick release hub 70 and the clamping of the clamp 58 to the frame 22 effectively fixes the elongated housing 54 to the bicycle frame 22.

An attachment forward sprocket assembly 72 is mounted on the sleeve bearing 66, with a first part positioned external to the elongated housing 54. The attachment forward sprocket assembly 72 is the same design as used on the conventional cycle rear wheel, so as to be interchangeable therewith. The attachment forward sprocket assembly 72 thereby engages to the cycle chain 40 when the elongated housing 54 is attached to the bicycle frame 22. The existing cycle gear change mechanism 42 can therefore be used to switch the chain 40 to different individual sprockets of the attachment forward sprocket assembly 72.

An attachment forward axle sprocket 74, which may be considered as part of the forward sprocket assembly, is mounted to the sleeve bearing 66. The attachment forward axle sprocket 74 may be external to the housing 54, but is preferably interior to the housing 54 as shown.

An attachment brake disk 76 is mounted to the sleeve bearing 66. The attachment brake disk 76 is positioned to be contacted by a caliper brake head 78 fixed to the housing 54. The caliper brake head 78 can be controllably operated by the rider with a conventional squeeze-type actuator (not shown) that is positioned on the bicycle handlebars and connected to the caliper break head 78 by a cable (not shown). This brake mechanism permits the rider to utilize rear braking of the bicycle 20 in a manner like that available on a conventional bicycle.

At a rear end 80 of the elongated housing 54 is a transversely extending attachment rear axle 82 that is rotationally mounted to the elongated housing 54 by a pair of bearings 84. An attachment rear axle sprocket 86 is mounted to the attachment rear axle 82. The oversize wheel or wheels 56 are mounted to the attachment rear axle 82. FIG. 1 shows a single axially offset rear wheel 56, while FIG. 3 shows a pair of symmetrically positioned rear wheels 56. An attachment drive chain 88 extends from the attachment forward axle sprocket 74 to the attachment rear axle sprocket 86. The drive train of the bicycle having the present attachment thus includes the crank and pedals 36, the cycle chain 40, the attachment forward sprocket assembly 72, the sleeve bearing 66, the attachment forward axle sprocket 74, the attachment drive chain 88, the attachment rear axle sprocket 86, the attachment rear axle 82, and the wheels 56. The gear ratio of this drive train is controllable by the rider by operating the gear change control 44 to activate the bicycle gear change mechanism 42 to select an individual sprocket of the attachment forward sprocket assembly 72.

FIGS. 1–3 illustrate an elongated, generally flat housing form and structure. Other structures and power transmission arrangements are possible, and two such approaches are shown in FIGS. 4 and 5. Except as indicated, the structures associated with these other designs are like those described in relation to FIGS. 1–3, and that description is incorporated.

FIG. 4 illustrates an elongated housing 90 in the form of a full yoke having a single hollow attachment forward housing portion 92 and two hollow attachment yoke arms 94 that extend on either side of the rear wheel 56, and a transversely extending yoke base 96 that connects the forward housing portion 92 to the yoke arms 94. To transmit power to the rear wheel 56, an idler axle arrangement is preferably used. A transversely extending idler axle 98 is rotatably mounted in the interior of the yoke base 96 on bearings 100. A first idler sprocket 102 is fixed to the central portion of the idler axle 98, in alignment with the attachment forward axle sprocket 74. A first attachment chain 104 extends from the attachment forward axle sprocket 74 to the first idler sprocket 102. A second idler sprocket 106 is fixed to one extremity of the idler axle 98, in alignment with the attachment rest axle sprocket 86. A second attachment chain 108 extends from the second idler sprocket 106 to the attachment rear axle sprocket 86. This arrangement transmits power to the rear wheels through a two-chain approach rather than the single chain of FIG. 3.

FIG. 5 depicts yet another elongated housing 110 In a half-yoke form having a hollow forward housing portion 112, a hollow single yoke arm 114 on one side of the wheel 56, and a hollow yoke base 116 connecting the forward housing portion 112 and the yoke arm 114. Power is conveyed from the attachment forward axle sprocket 74 to the attachment rear axle sprocket 86 by a single transversely flexible chain or drive 118. Such transversely flexible drives are commercially available. An operable and preferred flexible drive is available as the Flex-E-Belt ® Drive System from Winfred M. Berg, Inc. The flexible drive 118 conveys power between two sprockets that do not lie in the same plane, but without the need for the idler arrangement shown in FIG. 4.

The attachment of the invention may also include a modification to the front end of the bicycle so that it moves more readily over difficult terrain than possible with a conventional front wheel. For example, and as shown in FIG. 1, a ski 130 is mounted to the bicycle forward wheel fork 24 of the bicycle 20, by ski support arms 132. The ski support arms 132 are lockably fixed to the bicycle forward wheel fork 24 by a locking nut 134, locking hub, or other device. When the ski 130 is to be used, the ski support arms 192 are rotated to the position shown in FIG. 1, and the ski 130 is locked in position with the locking nut 134. The front wheel of the bicycle need not be removed. To convert back to use of the front wheel of the bicycle, the locking nut 134 is loosened, the ski support arms 132 and ski 130 are rotated upwardly (counterclockwise in FIG. 1) until the ski 130 is free of the surface on which the bicycle is supported, and the locking nut 134 is tightened.

The approach of the invention permits a conventional bicycle to be quickly and simply converted to a modified form having an oversize rear wheel suitable for use with surfaces that do not offer good traction to the conventional bicycle wheels. Driving, steering, gear changing, and breaking of the bicycle in the modified form are identical to these functions for the unmodified form, permitting the rider to concentrate on riding rather than a modified control system. The attachment of the invention is suitable for use on bicycles of various frame types.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An attachment for a cycle having a cycle frame with a cycle forward wheel fork, a cycle rear wheel fork having a pair of cycle rear wheel fork arms, a cycle rear wheel axle receiver on the cycle rear wheel fork arms, a cycle forward sprocket assembly, and a cycle chain drive extending rearwardly from the cycle forward sprocket assembly, the attachment comprising:

a removable frame extension, comprising a longitudinally elongated housing of a transverse width less than a width of the cycle rear wheel fork, such that the elongated housing removably fits between the cycle rear wheel fork arms, means for releasably fixing a forward end of the housing to the frame of the cycle, a transversely extending attachment forward axle mounted to the elongated housing, the attachment forward axle being adapted to be received in the cycle rear wheel axle receiver, an attachment forward sprocket assembly rotatably mounted to the attachment forward axle and engageable to the cycle chain drive when the attachment forward axle is received in the cycle rear wheel axle receiver, a transversely extending attachment rear axle rotatably mounted to the elongated housing, the attachment rear axle being adapted to mount at least one wheel thereon, the wheel having a transverse dimension too great to fit between the cycle rear wheel fork arms, an attachment rear sprocket assembly engaged to the attachment rear axle, and drive means for transmitting power from the attachment forward sprocket assembly to the attachment rear sprocket assembly.

2. The attachment of claim 1, wherein the housing is made from a composite material.

3. The attachment of claim 1, wherein the housing has a flat form and lies on a centerline of the cycle when mounted to the frame of the cycle, and the attachment rear axle extends from both sides of the housing so that two wheels may be mounted thereon.

4. The attachment of claim 1, wherein the housing includes a half yoke form in the region where the attachment rear axle mounts to the housing, and the attachment rear axle mounts to the half yoke.

5. The attachment of claim 1, wherein the housing includes a full yoke form having a pair of attachment yoke arms in the region where the attachment rear axle mounts to the housing, and the attachment rear axle mounts between the pair of attachment yoke arms.

6. The attachment of claim 1, further including attachment quick release hub means on the attachment forward axle for releasably attaching the attachment forward axle to the cycle rear wheel axle receiver.

7. The attachment of claim 1, wherein the means for releasably fixing includes a clamp adapted to fix the attachment housing to the frame of the cycle.

8. The attachment of claim 1, wherein the means for releasably fixing includes a clamp that is adjustable to fit various cycle frames.

9. The attachment of claim 1, wherein the drive means includes a chain extending between the attachment forward sprocket assembly and the attachment rear sprocket assembly.

10. The attachment of claim 1, wherein the drive means includes an intermediate idler axle rotatably mounted transversely to the attachment housing, a first intermediate sprocket fixed to the intermediate idler axle, a second intermediate sprocket fixed to the intermediate idler axle, a first attachment chain extending between the attachment forward sprocket assembly and the first intermediate sprocket, and a second attachment chain extending between the second intermediate sprocket and the attachment rear sprocket assembly.

11. The attachment of claim 1, wherein the drive means includes a transversely flexible chain extending from the attachment forward sprocket assembly and the attachment rear sprocket assembly.

12. The attachment of claim 1, further including a brake assembly supported in part on the attachment forward axle.

13. A cycle, comprising:

a cycle frame having a cycle forward wheel fork;

a cycle rear wheel fork having a pair of cycle rear wheel fork arms;

a cycle rear wheel axle receiver on the cycle rear wheel fork arms;

a cycle forward sprocket assembly, and a cycle chain drive extending rearwardly from the cycle forward sprocket assembly;

a removable frame extension, comprising a longitudinally elongated housing of a transverse width less than a width of the cycle rear wheel fork, such that the elongated housing removably fits between the cycle rear wheel fork arms, means for releasably fixing a forward end of the housing to the frame of the cycle, a transversely extending attachment forward axle mounted to the elongated housing, the attachment forward axle being adapted to be received in the cycle rear wheel axle receiver, an attachment forward sprocket assembly rotatably mounted to the attachment forward axle and engageable to the cycle chain drive when the attachment forward axle is received in the cycle rear wheel axle receiver, a transversely extending attachment rear axle rotatably mounted to the elongated housing, the attachment rear axle being adapted to mount at least one wheel thereon, the wheel having a transverse dimension too great to fit between the cycle rear wheel fork arms, an attachment rear sprocket assembly engaged to the attachment rear axle, and drive means for transmitting power from the attachment forward sprocket assembly to the attachment rear sprocket assembly.

14. The cycle of claim 13, wherein the housing has a flat form and lies on a centerline of the cycle when mounted to the frame of the cycle, and the attachment rear axle extends from both sides of the housing so that two wheels may be mounted thereon.

15. The cycle of claim 13, wherein the housing includes a half yoke form in the region where the attachment rear axle mounts to the housing, and the attachment rear axle mounts to the half yoke.

16. The cycle of claim 13, wherein the housing includes a full yoke form having a pair of attachment yoke arms in the region where the attachment rear axle mounts to the housing, and the attachment rear axle mounts between the pair of attachment yoke arms.

17. The cycle of claim 13, further including a ski mounted to the cycle forward wheel fork.

18. The cycle of claim 17, wherein the ski is pivotably and lockably mounted to the forward wheel fork.

* * * * *